United States Patent [19]
Fujiie

[11] Patent Number: 4,587,644
[45] Date of Patent: May 6, 1986

[54] TRACKING SERVOCONTROL CIRCUITS FOR REDUCING GAIN TO AVOID TRACKING DEFECT IN AN OPTICAL REPRODUCING APPARATUS

[75] Inventor: Kazuhiko Fujiie, Tokyo, Japan

[73] Assignee: Sony Corporation, Tokyo, Japan

[21] Appl. No.: 550,540

[22] Filed: Nov. 10, 1983

[30] Foreign Application Priority Data

| Nov. 11, 1982 | [JP] | Japan | 57-198091 |
| Nov. 19, 1982 | [JP] | Japan | 57-204382 |
| Feb. 19, 1983 | [JP] | Japan | 58-26625 |

[51] Int. Cl.$^4$ .................. G11B 7/095; G11B 21/10
[52] U.S. Cl. ............................ 369/44; 369/46; 369/54; 369/58
[58] Field of Search .................. 369/44, 46, 54, 58

[56] References Cited

U.S. PATENT DOCUMENTS

| 4,344,165 | 8/1982 | Akiyama | 369/44 |
| 4,406,000 | 9/1983 | Shoji et al. | 369/44 |
| 4,414,655 | 11/1983 | Shoji et al. | 369/44 |
| 4,475,182 | 10/1984 | Hosaka | 369/46 |
| 4,506,149 | 3/1985 | Utsumi | 369/46 |

FOREIGN PATENT DOCUMENTS

| 55-42304 | 3/1980 | Japan | 369/54 |
| 55-38686 | 3/1980 | Japan | 369/44 |
| 2029051 | 3/1980 | United Kingdom | 369/44 |

OTHER PUBLICATIONS

IBM Technical Disclosure Bulletin, vol. 21, No. 10, 3/1979, p. 4195.
IBM Technical Disclosure Bulletin, vol. 13, No. 11, Apr. 1971, p. 3386.
Patent Abstracts of Japan, vol. 2, No. 37, 3/13/78, p. 102E78.
Patent Abstracts of Japan, vol. 2, No. 129, 10/27/78, p. 7876E78.

Primary Examiner—Raymond F. Cardillo
Assistant Examiner—Hoa T. Nguyen
Attorney, Agent, or Firm—Lewis H. Eslinger; Alvin Sinderbrand

[57] ABSTRACT

A tracking servocontrol circuit for use in an optical reproducing apparatus comprises a signal generator for generating a tracking error signal representing a tracking error in respect of a light beam scanning the record track on a record medium from which a reproduced information signal is obtained. A servocontrol amplifier is supplied with the tracking error signal and produces a drive signal in response to the tracking error signal. The drive signal is supplied to a driving device for tracking servocontrol. A defect detector detects a variation in the reproduced information signal resulting from a defect on the recorded surface of the record medium, and a control circuit reduces the gain of the servocontrol amplifier when a predetermined detection output is obtained from the defect detector. This prevents the drive signal supplied to the driving device from being harmfully affected by the defect on the recorded surface of the record medium.

5 Claims, 18 Drawing Figures

FIG. 6F

TRACKING SERVOCONTROL CIRCUITS FOR REDUCING GAIN TO AVOID TRACKING DEFECT IN AN OPTICAL REPRODUCING APPARATUS

BACKGROUND OF THE INVENTION

1. Field of the Invention

This invention relates to control circuits for performing tracking servocontrol in an optical reproducing apparatus by which information recorded on a record medium, such as a video disc or digital audio disc, is optically reproduced.

2. Description of the Prior Art

In the field of information reproducing apparatus for reproducing a video signal, an audio signal and so on from a disc-shaped record medium which has thereon a record track formed with an alignment of pits provided in response to the information, there has been proposed an optical reproducing apparatus in which a light beam, such as a laser light beam, is used for scanning the record track on the disc-shaped record medium to read the information recorded therein by detecting the variations caused in the light beam, in a video disc system or a digital audio disc system.

For such an optical reproducing apparatus, it is required to perform automatic control for maintaining the light beam, which is directed onto the record medium to scan the record track thereon, in correct tracking relation to the record track. This automatic control is called tracking servocontrol and is indispensable for the optical reproducing apparatus of the kind mentioned above.

In order to carry out such tracking servocontrol, the optical reproducing apparatus is provided with a tracking servocontrol circuit which is operative to produce a tracking error signal representing positional deviation of the light beam from the center of the record track on the record medium. The tracking error signal is generated in response to the output signal of a photosensing device. The light beam is directed through an optical head to the record medium, which modulates the light beam in intensity and reflects the modulated light beam onto the photosensing device. The tracking error signal is employed; to drive an optical element, for example, a lens or a mirror constituting partially the optical head, to control the position thereof.

There has been proposed an optical system containing such a tracking servocontrol circuit for use in the optical reproducing apparatus as shown in FIG. 1. In the optical system of FIG. 1, a disc 1 has a spiral record track formed with an alignment of pits. A laser light beam emitted from a laser light source 2 enters through a diffraction grating 3 and a collimating lens 4 into a beam splitter 5 to pass through the same. The laser light beam having passed through the beam splitter 5 enters through a quarter-wave plate 6 into an object lens 7 to pass through the same to be caused to focus thereby on the disc 1. The object lens 7 is mounted movably in the direction transverse to the record track on the disc 1 and in the direction perpendicular to the surface of the disc 1 by driving devices 8 and 9, respectively. The laser light beam caused to impinge on the disc 1 is modulated in intensity in accordance with the record track thereon and then reflected to enter through the object lens 7 and the quarter-wave plate 6 into the beam splitter 5 to be reflected to the right in FIG. 1. The laser light beam reflected by the beam splitter 5 is led through a lens portion 10 to a photodetector 11. The photodetector 11 comprises plural light detecting elements and each of the light detecting elements detects the reflected laser light beam, which is modulated in intensity in accordance with the record track, from the beam splitter 5, that is, a reading light beam and produces a signal in response to the variations in intensity of the reading light beam. The signals derived from the photodetector 11 are supplied to a signal processing circuit arrangement 12 containing therein a tracking servocontrol circuit. In the tracking servocontrol circuit contained in the signal processing circuit arrangement 12, a driving signal for moving the object lens 7 to control the position thereof for performing tracking servocontrol is produced to be supplied to the driving device 8 provided for tracking servocontrol. The signal processing circuit arrangement 12 also contains a focus servocontrol circuit for performing focus servocontrol for maintaining correct focus of the laser light beam caused to impinge on the disc 1 in addition to the tracking servocontrol circuit, and further a reproduced information signal is derived from the signal processing circuit arrangement 12.

In the optical system described above, the laser light beam from the laser light source 2 is divided by the diffraction grating 3 into three light beams and therefore there are actually three light beams in both the light path from the diffraction grating 3 to the disc 1 and the light path from the disc 1 to the photodetector 11. These three light beams are caused to impinge on the disc 1 in the form of a main beam 13 for reading the information recorded on the record track T in tracking relation to the same and a couple of auxiliary beams 14E for detecting positional deviation of the main beam 13 from the center of the record track T, as shown in FIG. 2. The auxiliary beams 14E and 14F are located at the positions symmetrical in respect of the location of the main beam 13 in both the directions along and perpendicular to the record track T. The main beam 13 and the auxiliary beams 14E and 14F each reflected from the disc 1 are passed through the lens portion 10, which is composed of a cylindrical lens for detecting the focus condition of the main beam 13, and led to the different light detecting elements in the photodetector 11, respectively.

As shown in FIG. 3, the photodetector 11 comprises four light detecting elements 15A, 15B, 15C and 15D close to one another and two additional light detecting elements 16E and 16F distant from the light detecting elements 15A, 15B, 15C and 15D. The main beam 13 forms a spot on the light detecting elements 15A, 15B, 15C and 15D and the auxiliary beams 14E and 14F form spots on the light detecting elements 16E and 16F, respectively. The light detecting elements 15A, 15B, 15C and 15D produce respective output signals $I_A$, $I_B$, $I_C$ and $I_D$ each corresponding to a portion of the beam spot fromed on each of the light detecting elements 15A, 15B, 15C and 15D, and the light detecting elements 16E and 16F produce respective output signals $I_E$ and $I_F$ each corresponding to a portion of the beam spot formed on the light detecting elements 16E and 16F, respectively.

The signal processing circuit arrangement 12 has been previously constituted, for example, as shown in FIG. 4, in which a circuit for obtaining the reproduced information signal is shown together with the tracking servocontrol circuit and the focus servocontrol circuit.

The tracking servocontrol circuit comprises a subtracter 17 which is supplied with the output signals $I_E$ and $I_F$ of the light detecting elements 16E and 16F and produces a tracking error signal which represents positional deviation of the main beam 13 from the center of the record track, that is, a tracking error expressed as $I_E-I_F$. The tracking servocontrol circuit further comprises a servocontrol amplifier 18 which is supplied with the tracking error signal $I_E-I_F$ and supplies a driving current varying in response to the tracking error signal $I_E-I_F$ to the driving device 8 provided for tracking servocontrol. The driving device 8 is composed of a moving coil, and the object lens 7 is driven in response to the driving current flowing through the moving coil, so that the main beam 13 and the auxiliary beams 14E and 14F are shifted as a group in the direction transverse to the record track. The tracking error signal $I_E-I_F$ varies in polarity and level in response to the positional deviation of the main beam 13 from the center of the record track in the inner side or outer side of the disc 1 and the object lens 7 is so moved that the tracking error signal $I_E-I_F$ becomes zero. Thus, the tracking servocontrol is carried out.

Incidentally, the focus servocontrol circuit comprises an adder 19 for adding the output signal $I_A$ from the light detecting element 15A to the output signal $I_B$ from the light detecting element 15B, an adder 20 for adding the output signal $I_C$ from the light detecting element 15C to the output signal $I_D$ from the light detecting element 15D, a subtracter 21 which is supplied with the outputs from the adders 19 and 20 and produces a focus error signal $(I_A+I_B)-(I_C+I_D)$, and a servocontrol amplifier 22 which is supplied with the focus error signal and supplies a driving current varying in response to the focus error signal to the driving device 9 provided for focus servocontrol.

Further, the output signals $I_A+I_B$ and $I_C+I_D$ of the adders 19 and 20 are supplied to an adder 23 so that the reproduced information signal $I_A+I_B+I_C+I_D$ is obtained from the adder 23.

When the optical reproducing apparatus which employs such an optical system containing the tracking servocontrol circuit as described above is subjected to shocks or vibrations caused by some external force, variations in the mutual positional relation between the disc and the object lens are caused so that the tracking error is increased. In such a case, a situation may result in which the tracking error in respect of the light beams tracing a certain circle of the record track on the disc is suddenly increased by shocks to or vibrations of the optical reproducing apparatus to such an extent that the tracking servocontrol can no longer compensate. An undesirable track shift movement of the light beam may then occur, in which the light beam is shifted to another circle of the record track adjacent to the former circle of the record track and stays thereon, under the condition in which the focus servocontrol is still operative correctly despite the shocks or vibrations.

For the purpose of maintaining the light beams directed to the disc in correct tracking relation to the record track and avoiding the light beam track shift movement when the optical reproducing apparatus is subjected to shocks or vibrations caused by external force, it is advantagious to set the tracking servocontrol circuit so as to have a relatively high gain for control operation. When the gain with which the tracking servocontrol circuit performs the control operation is high, the tracking servocontrol circuit responds sensitively to a slight tracking error in respect of the light beams directed to the disc in order to drive a driving device for controlling, for example, the position of an object lens so as to eliminate the tracking error, and accordingly the tracking error is prevented from being increased excessively by shocks or vibrations affecting the optical reproducing apparatus.

The tracking servocontrol circuit with the gain set to be relatively high is effective for increasing resistance to shocks or vibrations and therefore advantageous for reproducing information from a disc which deos not have any defect such as a blemish on the recorded surface thereof. However, when a disc from which information is reproduced has defects on the recorded surface thereof, the tracking servocontrol circuit with the gain set to be relatively high brings about the following problem.

In the case of the disc having such defects on the recorded surface thereof, the defect would be read out by the auxiliary beams provided for detecting the tracking error as described above and a pulse noise resulting from the defect read out by the auxiliary beam would appear in the tracking error signal. When such a pulse noise appears in the tracking error signal, a pulse current is supplied to the driving device provided for tracking servocontrol in response to the pulse noise. In such a case, if the gain with which the tracking servocontrol circuit performs the control operation is set to be relatively high, the pulse current flowing through the driving device provided for tracking servocontrol in response to the pulse noise becomes extremely large in amplitude so that the tracking servocontrol is put into disorder and therefrore the track shift movement of the light beam on the disc is caused.

OBJECTS AND SUMMARY OF THE INVENTION

Accordingly, it is an object of the present invention to provide a tracking servocontrol circuit for use in an optical reproducing apparatus which is operative to perform tracking servocontrol in a first mode which is unlikely to be adversely affected by a defect such as a blemish on the recorded surface of a record medium when a light beam for detecting a tracking error scans a portion of the recorded surface of the disc where the defect exists and to perform tracking control in a second mode which is superior in resistance to shocks or vibrations caused by some external force inflicted on the optical reproducing apparatus when the light beam scans a portion of the recorded surface of the disc where no defect exists.

Another object of the present invention is to provide a tracking servocontrol circuit for use in an optical reproducing apparatus which is operative to perform tracking servocontrol in a first mode which can avoid an undesirable track shift movement of a light beam for reading information from a record medium even if a pulse noise resulting from a defect such as a blemish on the recorded surface of the record medium appears in a tracking error signal and to perform tracking servocontrol in a second mode which is superior in resistance to shocks or vibrations when some external force is inflicted on the optical reproducing apparatus to cause the shocks or vibrations.

According to an aspect of the present invention, there is provided an improved tracking servocontrol circuit for use in an optical reproducing apparatus which comprises a tracking error signal generating portion for producing a tracking error signal in response to a tracking error in respect of a light beam scanning the record track on a record medium from which a reproduced information signal is obtained, a servocontrol amplifier supplied with the tracking error signal and supplying a drive signal obtained in response to the tracking error signal to a driving device for tracking servocontrol, and a defect detecting portion for detecting a variation in the reproduced information signal resulting from a defect on the recorded surface of the record medium, and in which the gain of the servocontrol amplifier is set to be relatively low or signal components of relatively high frequency in the tracking error signal are limited in amplitude when a predetermined defect detection output is obtained from the defect detecting portion.

In one embodiment of such a tracking servocontrol circuit according to the present invention, a level detecting portion for detecting an amplitude of the tracking error signal exceeding a predetermined level is further provided, and the gain of the servocontrol amplifier is set to be relatively high only when the predetermined defect detection output is not obtained from the detect detecting portion but a predetermined level detection output is obtained from the level detecting portion.

With the tracking servocontrol circuit according to the present invention mentioned above, only when the defect on the recorded surface of the record medium is read by the light beam for detecting the tracking error and the pulse noise resulting from the defect appears in the tracking error signal, is the gain with which the tracking servocontrol is performed set to be low or the pulse noise, which is contained in the tracking error signal in the form of the signal components of relatively high frequency, limited in amplitude. Consequently the tracking servocontrol can be carried out stably with superior resistance to shocks or vibrations unless the defect on the recorded surface of the record medium is read and without being harmfully affected by the pulse noise which appears in the tracking error signal when the defect on the recorded surface of the record medium is read.

The above, and other objects, features and advantages of the present invention will become apparent from the following detailed description thereof taken in conjunction with the accompanying drawings.

BRIEF DESCRIPTION OF THE DRAWINGS

FIGS. 6A to 6F are waveform diagrams used for explaining the operation of the embodiment shown in FIG. 5;

DESCRIPTION OF THE PREFERRED EMBODIMENTS

Now, embodiments of tracking servocontrol circuit for use in an optical reproducing apparatus according to the present invention will be explained with reference to the drawings.

Figure 1:
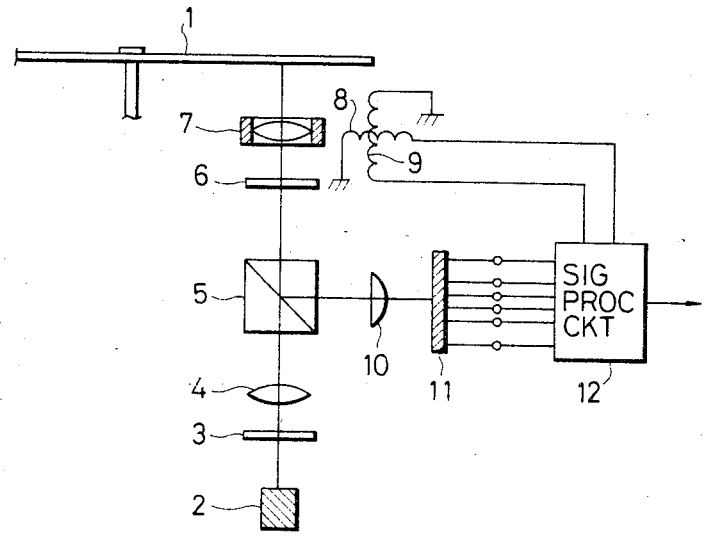
FIG. 1 is a schematic illustration showing an example of a conventional optical system employed in an optical reproducing apparatus.
Figure 2:
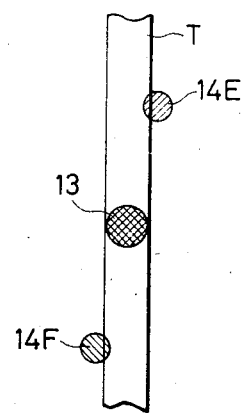
FIG. 2 is an illustration used for explaining light beams used in the optical system shown in FIG. 1.
Figure 3:
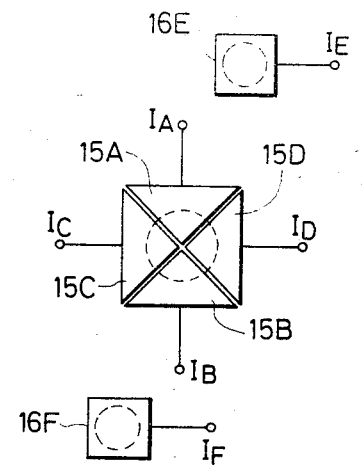
FIG. 3 is a schematic illustration showing the conventional configuration of a photodetector used in the optical system shown in FIG. 1.
Figure 4:
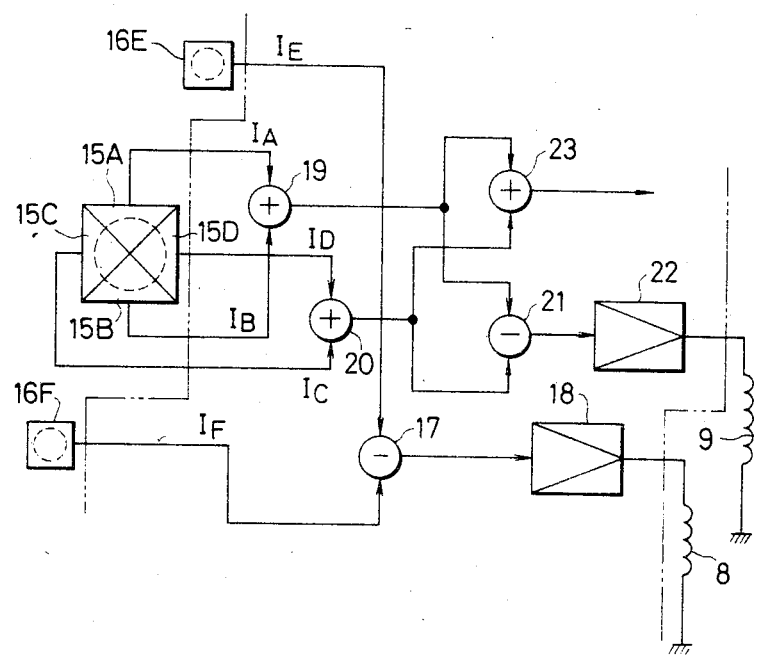
FIG. 4 is a block diagram showing an example of a previously proposed signal processing circuit arrangement used with the optical system shown in FIG. 1.
Figure 5:
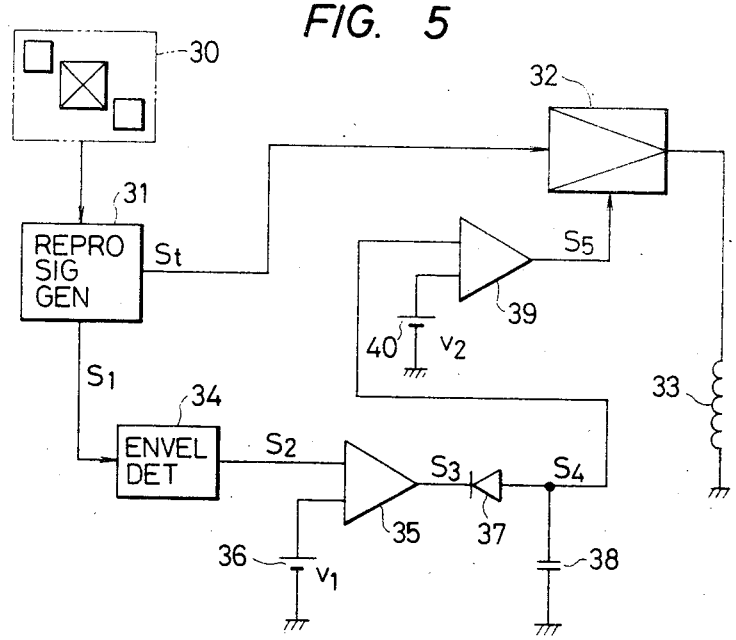
FIG. 5 is a block diagram showing an embodiment of tracking servocontrol circuit for use in an optical reproducing apparatus according to the present invention.

FIG. 5 shows one example of a tracking servocontrol circuit for use in an optical reproducing apparatus according to the present invention which is employed in an optical reproducing apparatus having the optical system shown in FIG. 1. In this example, a photodetector 30 contains the light detecting elements 15A–15D, 16E and 16F shown in FIG. 3 and the output signals of the photodetector 30 are supplied to a reproduced signal generator 31. The reproduced signal generator 31 includes a tracking error signal generating portion which corresponds to the subtracter 17 shown in FIG. 4 and produces a tracking error signal $S_t$ on the strength of the output signals of the photodetector 30, and a reproduced information signal generator which corresponds to a combination of the adders 19, 20 and 23 shown in FIG. 4 and produces a reproduced information signal $S_1$ on the strength of the output signals of the photodetector 30. The first output terminal of the reproduced signal generator 31, from which the tracking error signal $S_t$ is derived, is connected to the input terminal of a variable gain servocontrol amplifier 32, and the output terminal of the variable gain servocontrol amplifier 32 is connected to a tracking driving device 33 provided for tracking control. The gain of the variable gain servocontrol amplifier 32 with which the tracking servocontrol is performed is so set as to be relatively high in the stably operating condition in which the output signals of the photodetector 30 are obtained from a normal portion of the disc.

The second output terminal of the reproduced signal generator 31, from which the reproduced information signal $S_1$ is derived, is connected to an envelope detector 34. The output terminal of the envelope detector 34 is connected to the comparing input terminal of a level comparator 35 and the reference input terminal of the level comparator 35 is connected to a reference voltage source 36. The reference voltage source 36 supplies a voltage of a reference level $v_1$ which is selected to be higher than the level of the reproduced information signal $S_1$ appearing when the defect on the recorded surface of the disc is read by the optical head provided in the optical reproducing apparatus and lower than the level of the reproduced information signal $S_1$ obtained in the stable operating condition. Although the level of the reproduced information signal $S_1$ obtained in the stably operating condition is reduced when the optical reproducing apparatus is subjected to shocks and vibrations caused by external force, the reference level $v_1$ is selected to be lower than such a reduced level of the reproduced information signal $S_1$. The output terminal of the level comparator 35 is connected through a diode 37 and a condenser 38 forming jointly an integrating circuit to the comparing input terminal of a level comparator 39, and the reference input terminal of the comparator 39 is connected to a reference voltage source 40. The output terminal of the level comparator 39 is connected to the gain control terminal of the variable gain servocontrol amplifier 32.

Then, the operation of the example of the tracking servocontrol circuit according to the present invention thus constituted will be explained hereinafter. In the stably operating condition in which information is reproduced by the optical reproducing apparatus from the normal portion of the recorded surface of a disc where no defect exists, the tracking error signal $S_t$ obtained from the first output terminal of the reproduced signal generator 31 takes its ordinary level and the reproduced information signal $S_1$ obtained from the second output terminal of the reproduced signal generator 31 takes also its ordinary level. The reproduced information signal $S_1$ taking the ordinary level thereof is supplied to the envelope detector 34 and a signal $S_2$ having a level corresponding to the envelope level of the reproduced information signal $S_1$ is obtained from the envelope detector 34 and supplied to the level comparator 35. The level of the signal $S_2$ is higher than the reference level $v_1$ of the voltage supplied from the reference voltage source 36. Accordingly, a comparison output $S_3$ obtained from the level comparator 35 at which the level of the signal $S_2$ is compared with the reference level $v_1$ takes a predetermined high level. This comparison output $S_3$ of the high level is supplied to the integrating circuit formed with the diode 37 and the condenser 38 to produce a voltage $S_4$ having an almost constant high level corresponding to the high level of the comparison output $S_3$. The voltage $S_4$ of the high level is supplied to the level comparator 39 to be compared with the reference level $v_2$ of the voltage supplied from the reference voltage source 40. The reference level $v_2$ is selected to be slightly lower than the high level of the voltage $S_4$ and therefore a comparison output $S_5$ obtained from the level comparator 39 takes a predetermined high level. This comparison output $S_5$ of high level is supplied to the gain control terminal of the variable gain servocontrol amplifier 32 and thereby the variable gain servocontrol amplifier 32 amplifies the tracking error signal $S_t$ obtained from the first output terminal of the reproduced signal generator 31 with relatively high gain. As a result of this, in this situation, the tracking servocontrol is carried out with relatively high gain and consequently the stabilized tracking servocontrol is maintained without causing the light beam on the disc to have the track shift movement even if the optical reproducing apparatus is subjected to shocks or vibrations caused by external force.

Figure 6A:
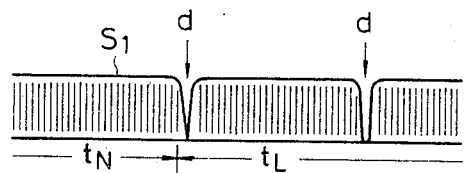

In case that a disc from which information is reproduced by the optical reproducing apparatus has defects such as blemishes on the recorded surface thereof, the reproduced information signal $S_1$ contains depressed portions d appearing whenever each defect is read by the optical head, as shown in FIG. 6A. Generally, the defect on the recorded surface of the disc extends over several circles of the record tracks and therefore the depressed portion d in the reproduced information signal $S_1$ appears repeatedly every turn of the disc during a period depending on the size of the defect. In FIG. 6A, $t_N$ represents a period in which a normal portion of the recorded surface of the disc where no defect exists is scanned by the optical head and $t_L$ represents a period in which a portion of the recorded surface of the disc where the defects exist is scanned by the optical head.

Figure 6B:
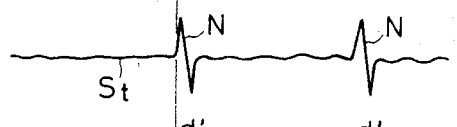

In the period $t_L$, the tracking error signal $S_t$ contains therein pulse noise N with large amplitude which appears whenever each defect is read by the optical head, as shown in FIG. 6B.

Figure 6C:
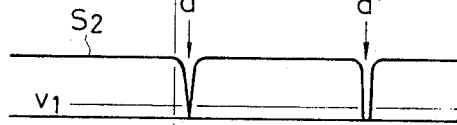
Figure 6D:
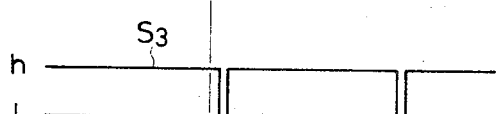
Figure 6E:
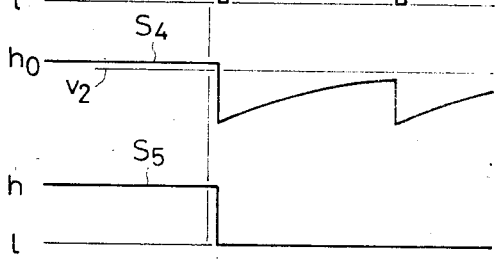

During the period $t_L$ shown in FIG. 6A, the reproduced information signal $S_1$ containing the depressed portions d is supplied to the envelope detector 34 and the signal $S_2$ having a level corresponding to the envelope level of the reproduced information signal $S_1$ as shown in FIG. 6C is obtained from the envelope detector 34. This signal $S_2$ contains low level portions d' corresponding to the depressed portions d in the reproduced information signal $S_1$. The level of the signal $S_2$ is compared with the reference level $v_1$ of the voltage supplied from the reference voltage source 36, as shown in FIG. 6C, at the level comparator 35. The comparison output $S_3$ from the level comparator 35 takes a low level 1 (FIG. 6D) at portions corresponding to the low level portions d' each having a level lower than the reference level $v_1$ and a high level h at the remaining portions. The comparison output $S_3$ is integrated by the combination of the diode 37 and the condenser 38 to produce the voltage $S_4$ as shown in FIG. 6E at the condenser 38. In this integration performed at the combination of the diode 37 and the condenser 38 in the period $t_L$, the time constant for integration is so selected that the level of the voltage $S_4$ does not reach a high level $h_0$ which is taken by the voltage $S_4$ during the period $t_N$. The level of the voltage $S_4$ is compared with the reference level $v_2$ of the voltage supplied from the reference voltage source 40 which is selected to be slightly lower than the high level $h_0$ taken by the voltage $S_4$ during the period $t_N$, as shown in FIG. 6E, at the level comparator 39. The comparison output $S_5$, which takes the high level h during the period $t_N$ and the low level 1 during the period $t_L$ as shown in FIG. 6F, is obtained from the level comparator 39.

In the manner mention above, the period $t_L$, in which the portion of the recorded surface of the disc where the defects exist is scanned by the optical head, is detected with the low level portion of the comparison output $S_5$, and accordingly the envelope detector 34, the level comparator 35, the diode 37, the condenser 38 and the level comparator 39 form jointly a defect detecting portion.

The comparison output $S_5$ obtained from the level comparator 39 with the low level 1 is supplied to the gain control terminal of the variable gain servocontrol amplifier 32, so that the gain of the variable gain servocontrol amplifier 32 is reduced and accordingly the tracking servocontrol is carried out with reduced gain in the period $t_L$. As a result of this, it is avoided that the tracking servocontrol is put into disorder by the pulse noise N appearing in the tracking error signal $S_t$ and that the track shift movement of the light beam on the disc is caused.

As described above, with the tracking servocontrol circuit shown in FIG. 5, tracking servocontrol superior in resistance to shocks or vibrations is carried out with relatively high gain of the variable gain servocontrol amplifier when the normal portion of the recorded surface of the disc where no defect exists is scanned by the optical head; and tracking servocontrol not likely to be harmfully affected by a defect on the record surface of the disc is carried out with reduced gain of the variable gain servocontrol amplifier when the portion of the record surface of the disc where the defect exists is scanned by the optical head.

Figure 7:
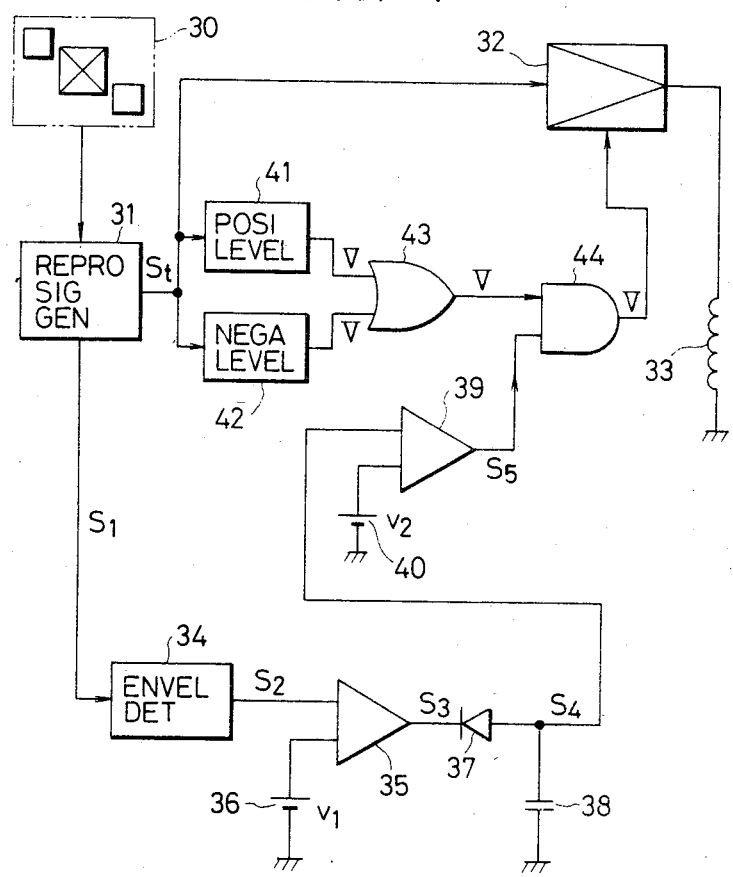
FIG. 7 is a block diagram showing another embodiment of tracking servocontrol circuit for use in an optical reproducing apparatus according to the present invention.

FIG. 7 shows another example of the tracking servocontrol circuit for use in an optical reproducing apparatus according to the present invention. In FIG. 7, blocks and elements corresponding to those of FIG. 5 are marked with the same references and further description thereof will be omitted. This example is operative to perform gain control for the variable gain servocontrol amplifier in response to the amplitude of the tracking error signal in addition to the gain control performed in the example of FIG. 5.

In this example, the first output terminal of the reproduced signal generator 31 is connected to both the input terminal of a positive level detector 41 for conducting the detection in respect of the positive level of the tracking error signal $S_t$ and the input terminal of a negative level detector 42 for conducting the detection in respect of the negative level of the tracking error signal $S_t$. Accordingly, the tracking error signal $S_t$ is supplied to the positive and negative level detectors 41 and 42, and the positive and negative levels of the tracking error signal $S_t$ are compared with selected positive and negative reference levels $+e_1$ and $-e_1$, respectively, thereat so as to produce a level detection output when the positive level of the tracking error signal $S_t$ is equal to or higher than the positive reference level $+e_1$ or the negative level of the tracking error signal $S_t$ is equal to or lower than the negative reference level $-e_1$. The level detection output produced in the positive level detector 41 is obtained in the form of a positive voltage V at the output terminal of the positive level detector 41 and similarly the level detection output produced in the negative level detector 42 is obtained also in the form of the positive voltage V at the output terminal of the negative level detector 42.

Each of the positive and negative reference levels $+e_1$ and $-e_1$ is so selected that the relatively small amplitude of the tracking error signal $S_t$ taken in the normal operation state in which the optical reproducing apparatus is not subjected to shocks or vibrations caused by external force does not reach thereto but the relatively large amplitude of the tracking error signal $S_t$ taken in the abnormal operation state in which the optical reproducing apparatus is subjected to shocks or vibrations reaches thereto or exceeds therebeyond.

The output terminals of the positive and negative level detectors 41 and 42 are connected to an OR gate 43 which has its output terminal connected to one of the input terminals of an AND gate 44. Further, the output terminal of the level comparator 39 is connected to the other of the input terminals of the AND gate 44 and the output terminal of the AND gate 44 is connected to the gain control terminal of the variable gain servocontrol amplifier 32.

The remaining portions of this example are formed in the same manner as the example of FIG. 5.

With the tracking servocontrol circuit of FIG. 7 thus constituted, tracking servocontrol is carried out in the same manner as in the circuit of FIG. 5 in the stably operating condition in which information is reproduced by the optical reproducing apparatus from the normal portion of the disc where no defect exists.

When the optical reproducing apparatus under such condition is subjected to shocks or vibrations caused by external force, the tracking error signal $S_t$ has relatively large amplitude positive and negative excursions. The positive and negative levels taken by this large amplitude of the tracking error signal $S_t$ become equal to or higher and lower than the positive and negative reference levels $+e_1$ and $-e_1$, respectively, and positive voltages V of the level detection outputs are obtained from the positive and negative level detectors 41 and 42. The positive voltages V are supplied through the OR gate 43 to one input terminal of the AND gate 44. At this time, the comparison output $S_5$ obtained at the output terminal of the level comparator 39 and supplied to the other terminal of the AND gate 44 takes a high level. Accordingly, the AND gate 44 is turned on and the voltage V which is supplied to one input terminal of the AND gate 44 from the OR gate 43 is derived from the AND gate 44 to be supplied to the gain control terminal of the variable gain servocontrol amplifier 32 as a gain control signal for increasing the gain of the variable gain servocontrol amplifier 32. Consequently, the gain of the variable gain servocontrol amplifier 32 is increased and tracking servocontrol is carried out with increased gain, so that stabilized tracking servocontrol is maintained without causing the light beam on the disc to have the track shift movement even if the optical reproducing apparatus is subjected to shocks or vibrations caused by external force.

Figure 8A:
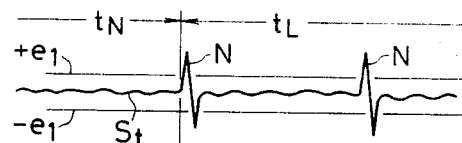
FIG. 8A to 8D are waveform diagrams used for explaining the operation of the embodiment shown in FIG. 7.
Figure 8B:
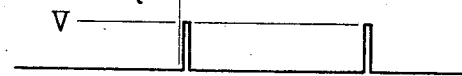
Figure 8C:
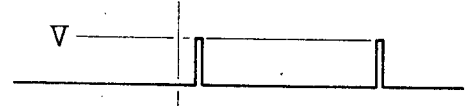
Figure 8D:
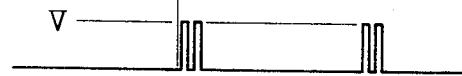

In case that the disc has defects such as blemishes on the recorded surface thereof, the tracking error signal $S_t$ derived from the first output terminal of the reproduced signal generator 31 contains pulse noise N with large amplitude which appears when the defects are read by the optical head, as shown in FIG. 8A. The positive and negative levels taken by this large amplitude of the pulse noise N easily exceed the positive reference level $+e_1$ provided at the positive level detector 41 and the negative reference level $-e_1$ provided at the negative level detector 42, and therefore a positive voltage V as shown in FIG. 8B is obtained from the positive level detector 41 in response to a portion of positive level of each pulse noise N and another positive voltage V as shown in FIG. 8C is obtained from the negative level detector 42 in response to a portion of negative level of each pulse noise N in the period $t_L$. These positive voltages V are derived through the OR gate 43 as shown in FIG. 8D and supplied to one of the input terminals of the AND gate 44.

In the period $t_L$, the signal $S_2$ derived from the envelope detector 38 has low level portions d′ corresponding to the depressed portions in the reproduced information signal $S_1$ as shown in FIG. 6C and the comparison output $S_5$ taking the low level l is obtained from the level comparator 39 in the same manner described in connection with FIG. 5. Accordingly, the AND gate 44 is in the off state during the period $t_L$ so that the positive voltages V derived from the OR gate 43 are prevented from being supplied to the gain control terminal of the variable gain servocontrol amplifier 32. As a result of this, the gain of the variable gain servocontrol amplifier 32 is not increased in the period $t_L$ even if the positive voltage V is obtained from the positive or negative level detectors 41 and 42, and it is avoided that the tracking servocontrol is put into disorder by the pulse noise N appearing in the tracking error signal $S_t$ and that the track shift movement of the light beam on the disc is caused.

As described above, with the tracking servocontrol circuit of FIG. 7, the gain of the variable gain servocontrol amplifier 32 is increased only when the optical reproducing apparatus is subjected to shocks or vibrations caused by external force inflicted thereon in the stably operating condition in which the normal portion of the disc without any defect is scanned by the optical head.

Figure 9:
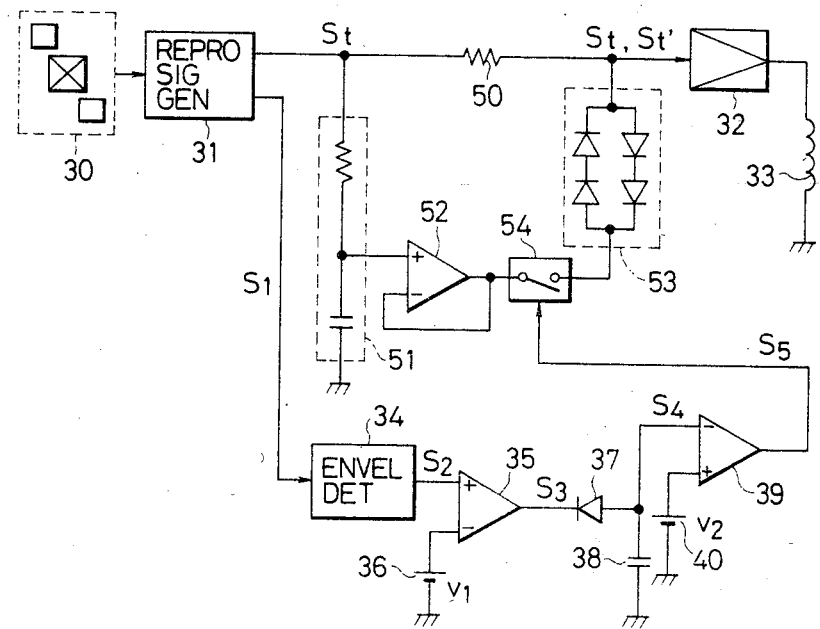
FIGS. 9 and 10 are block diagrams showing other embodiments of tracking servocontrol circuits for use in an optical reproducing apparatus according to the present invention.

FIG. 9 shows a further example of the tracking servocontrol circuit for use in an optical reproducing apparatus according to the present invention. In FIG. 9 also, blocks and elements corresponding to those of FIG. 5 are marked with the same references and further description thereof will be omitted. In this example, the first output terminal of the reproduced signal generator 31 is connected through a resistor 50 to the input terminal of the variable gain servocontrol amplifier 32, and a low pass filter 51, a voltage follower 52, a diode arrangement 53 and a switch 54 having a control terminal connected to the output terminal of the level comparator 39 are connected in series with each other and in parallel with the resistor 50. The low pass filter, the voltage follower 52 and the diode arrangement 53 are operative to form, in cooperation with the resistor 50, an amplitude limiter for relatively high frequency components of the tracking error signal $S_t$ when the switch 54 is turned on and such an amplitude limiter is not formed when the switch is turned off. Accordingly, the tracking error signal $S_t$ is supplied to the variable gain servocontrol amplifier 32 selectively through the amplitude limiter when the switch 54 is conductive and through only the resistor 50 when the switch 54 is nonconductive. When the amplitude limiter is formed, the low frequency component of the tracking error signal $S_t$ is obtained at the output terminal of the low pass filter 51 and supplied through the voltage follower 52 and the switch 54 to one end of the diode arrangement 53 having the other end thereof connected to the input terminal of the variable gain servocontrol amplifier 32. Therefore the tracking error signal $S_t$ supplied to the variable gain servocontrol amplifier 32 is limited in amplitude into a range from a level lower by a voltage drop caused by the diode arrangement 53 than the output level of the low pass filter 51 to a level higher by the voltage drop caused by the diode arrangement 53 than the output level of the low pass filter 51.

The switch 54 is supplied through the control terminal thereof with the comparison output $S_5$ from the level comparator 39 so as to be turned on by the low level l of the comparison output $S_5$ and turned off by the high level h of the comparison output $S_5$. Consequently, in the period $t_L$ in which a portion of the recorded surface of the disc where the defects exist is scanned by the optical head, since the comparison output $S_5$ from the level comparator 39 takes the low level l and the switch 54 is turned on to form the amplitude limiter, the relatively high frequency components of the tracking error signal $S_t$ containing the pulse noise N as shown in FIG. 6B are limited in amplitude and, as a result of this, the tracking error signal $S_t$ in which the pulse noise N is sufficiently suppressed is supplied to the variable gain servocontrol circuit 32 and tracking servocontrol not likely to be harmfully affected with the noise N is carried out. On the other hand, in the period $t_N$ in which a normal portion of the recorded surface of the disc where no defect exists is scanned by the optical head, since the comparison output $S_5$ takes the high level h and the switch 54 is turned off in order not to form the amplitude limiter, the tracking error signal $S_t$ obtained from the reproduced signal generator 31 is supplied through the resistor 50 to the variable gain servocontrol amplifier 32 without being limited in amplitude and, as a result of this, tracking servocontrol superior in resistance to shocks or vibrations is carried out.

Figure 10:
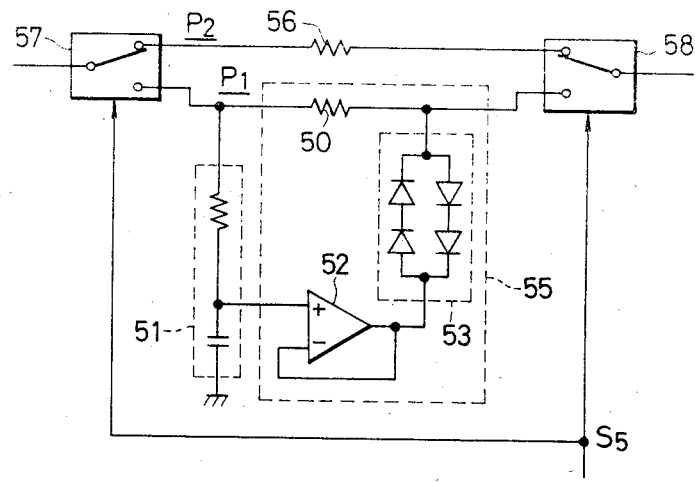

FIG. 10 shows part of a further example of the tracking servocontrol circuit for use in an optical reproducing apparatus according to the present invention. This example may be obtained by modifying the tracking servocontrol circuit of FIG. 9 in such a manner that an amplitude limiter 55 is formed with the resistor 50, the voltage follower 52 and the diode arrangement 53 but without the switch 54, and a signal path $P_1$ containing the low pass filter 51 and the amplitude limiter 55 and another signal path $P_2$ containing a resistor 56 are provided to be selected by switches 57 and 58 each having a control terminal connected to the output terminal of the level comparator 39, between the first output terminal of the reproduced signal generator 31 and the input terminal of the variable gain servocontrol amplifier 32. The switches 57 and 58 are controlled to select the signal path $P_1$ when the comparison output $S_5$ from the level comparator 39 takes the low level l and to select the signal path $P_2$ when the comparison output $S_5$ takes the high level h. Accordingly, in the period $t_L$ in which a portion of the recorded surface of the disc where the defects exist is scanned by the optical head, the tracking error signal $S_t$ from the first output terminal of the reproduced signal generator 31, in which the pulse noise N is suppressed by the amplitude limiter 55, is supplied to the variable gain servocontrol amplifier 32 through the signal path $P_1$, and in the period $t_N$ in which a normal portion of the recorded surface of the disc where no defect exists is scanned by the optical head, the tracking error signal $S_t$ is supplied through the resistor 56 to the variable gain servocontrol amplifier 32. As a result of this, tracking servocontrol the same as that performed with the circuit of FIG. 9 is also carried out with the circuit of FIG. 10.

What is claimed is:

1. A tracking servocontrol circuit for use in an optical reproducing apparatus; comprising:
    signal generating means for producing a tracking error signal representing a tracking error in respect of a light beam scanning a record track on a recorded surface of a record medium from which a reproduced information signal is obtained;
    driving means operative to move the position of the light beam on the record medium for tracking servocontrol;
    a servocontrol amplifier formed with a gain control terminal and supplied with the tracking error signal for producing a drive signal in response to the tracking error signal and supplying said drive signal to said driving means;
    defect detecting means for detecting a variation in the reproduced information signal resulting from a defect on the recorded surface of the record medium and producing a detection output signal corresponding thereto; and
    control means operative in response to a predetermined detection output signal of said defect detecting means to supply said detection output signal to said gain control terminal to reduce the gain of said servocontrol amplifier and thereby prevent the drive signal supplied to said driving means from being harmfully affected by the defect on the recorded surface of the record medium.

2. A tracking servocontrol circuit for use in an optical reproducing apparatus according to claim 1; further comprising level detecting means for detecting an amplitude level of the tracking error signal exceeding a predetermined level and for producing an amplitude level output signal corresponding thereto, said control means being operative to set the gain of said servocontrol amplifier to be relatively high only when said predetermined detection output signal is not obtained but a predetermined amplitude level output signal is obtained.

3. A tracking servocontrol circuit for use in an optical reproducing apparatus according to claim 2; wherein said control means comprises gate means including a couple of input terminals responsive to said detection output signal and said amplitude level output signal, respectively, and an output terminal connected to said servocontrol amplifier for controlling the gain thereof.

4. A tracking servocontrol circuit for use in an optical reproducing apparatus according to claim 3; wherein said gate means comprises an AND gate and said predetermined detection output signal and said predetermined amplitude level output signal take a low level and high level, respectively.

5. A tracking servocontrol circuit for use in an optical reproducing apparatus according to claim 1; wherein said defect detecting means is operative to produce said predetermined detection output signal in response to depressed portions contained in the reproduced information signal.

* * * * *